United States Patent [19]

Hansel et al.

[11] Patent Number: 4,729,124
[45] Date of Patent: Mar. 1, 1988

[54] DIAGNOSTIC SYSTEM

[75] Inventors: Allen Hansel, Sea Bright; Kenneth Yeager, Eatontown, both of N.J.

[73] Assignee: Concurrent Computer Corporation, Holmdel, N.J.

[21] Appl. No.: 811,061

[22] Filed: Dec. 19, 1985

[51] Int. Cl.$^4$ .............................................. G06F 11/00
[52] U.S. Cl. ........................................ 371/18; 364/200
[58] Field of Search ............................ 371/18, 16, 15; 364/200

[56] References Cited

U.S. PATENT DOCUMENTS

| | | | |
|---|---|---|---|
| 3,879,712 | 4/1975 | Edge et al. | 364/200 |
| 4,371,952 | 2/1983 | Schuck | 371/16 X |
| 4,412,281 | 10/1983 | Works | 364/200 |
| 4,466,063 | 8/1984 | Segarra et al. | 364/200 |
| 4,486,826 | 12/1984 | Wolff et al. | 364/200 |

Primary Examiner—Charles E. Atkinson
Attorney, Agent, or Firm—Edwin T. Grimes; Frances L. Masselle; Thomas P. Murphy

[57] ABSTRACT

The present invention is directed to a diagnostic system which utilizes a microprocessor within the power module to control the diagnostic function of all field replaceable modules powered thereby; additional diagnostic hardware being located on each replaceable module which may be utilized in normal operation for functions of the module and, on an interrupt basis, it is utilized in diagnostic functions; the diagnostic hardware in the power module serving to collect the diagnostic test data from all the functional modules powered thereby, the data being transmitted thereto over a diagnostic data bus. If a plurality of power supplies are present in the system, each power supply has a microprocessor for control, each such microprocessor being coupled to the replaceable modules and the diagnostic circuitry therein; a bus being provided between the processors in the power supplies so that one such microprocessor can become a master diagnostic to process all the diagnostic messages from the system.

9 Claims, 3 Drawing Figures

DIAGNOSTIC SYSTEM

FIELD OF THE INVENTION

The invention relates broadly to the field of digital computers and particularly to a diagnostic sub-system within a computer system having a plurality of processor modules.

BACKGROUND OF THE INVENTION

With the advent of high-density computer logic and multi-functional replaceable boards, it has been desirable to be able to detect malfunctioning replaceable elements so as to decrease the time required to repair a system when a failure occurs. In typical systems manufactured to date, various error condition detectors are located throughout the system. When a detectable error occurs, a latch is set and an error indication may be transmitted to the system console to alert the system operator to the error. Alternatively, the detected error condition may be stored in a system error log which can later be analyzed by a repair technician to determine whether a part should be replaced. Typically, the system error log is stored in some non-volatile memory such as on a magnetic disk or tape.

Other computer systems utilize a separate diagnostic processor capable of performing a plurality of functions including loading and running diagnostic programs in an attempt to isolate the failing hardware to a field replaceable module. The diagnostic processor may also perform system wide error logging and CPU self-test on system start-up. The diagnostic processor may also be able to down-load diagnostic programs into the computer from a floppy disk or the like and execute those diagnostic programs and analyze the results to isolate a failing module.

While these approaches do provide the user with some means to detect and identify modules that have failed, they do have their weaknesses. For example, such diagnostic hardware is designed to be usable for diagnostic purposes. As such, printed circuit board space is taken up by hardware used solely for diagnostic purposes thereby diminishing the space available for hardware used directly in productive computer operation. Such dedicated diagnostic hardware also increases the cost of the computer system. If it is effective in locating failed replaceable modules, such diagnostic hardware may reduce the system cost over its lifetime by reducing maintenance costs.

A centralized diagnostic approach as described above has other problems. Such a design usually requires a large number of communication lines or extensive hardware to multiplex fewer lines. This approach does increase the probability of a communication failure as well as reduce the available space for system communication lines. A further disadvantage is that the program for the central diagnostic processor must be changed when another element is added to the processor.

In view of the above-mentioned problems associated with diagnostic hardware in computer systems, it is the principal objective of the present invention to provide a more cost effective diagnostic capability than has heretofore been achieved.

It is still a further objective of the invention to provide a diagnostic system which shares elements of the computer, but does not sacrifice the ability to locate module failures.

It is yet another objective of the invention to provide a diagnostic system which is largely immune to power failures within the computer system itself.

BRIEF DESCRIPTION OF THE INVENTION

In achieving these and other objectives, the diagnostic system of the present invention utilizes the microprocessor within the power module to control the diagnostic function of all field replaceable modules powered thereby. Some additional diagnostic hardware is located on each replaceable module which may be utilized in normal operation for functions of the module and, on an interrupt basis, it is utilized in diagnostic functions. The diagnostic hardware in the power module serves to collect the diagnostic test data from all the functional modules powered thereby and the data is transmitted thereto over a diagnostic data bus.

If a plurality of power supplies are present in the system, each power supply has a microprocessor for control. Each such microprocessor is coupled to the replaceable modules and the diagnostic circuitry therein. In addition, a bus is provided between the processors in the power supplies so that one such microprocessor can become a master diagnostic microprocessor to process all the diagnostic messages from the system.

BRIEF DESCRIPTION OF THE DRAWINGS

The foregoing and other objects, advantages and features are described in greater detail below in connection with the drawings which form a part of the disclosure wherein.

DETAILED DESCRIPTION

Figure 1:
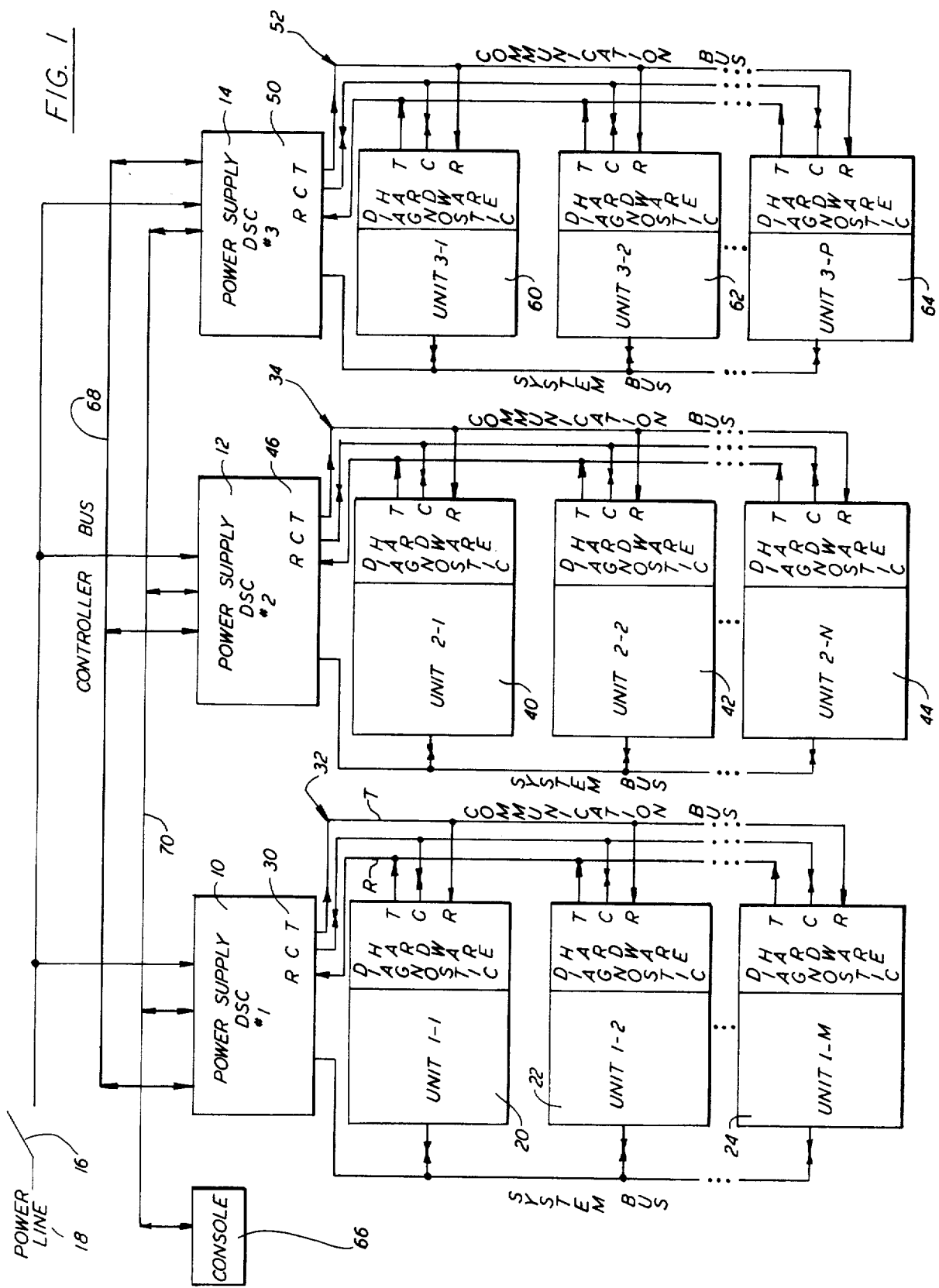
FIG. 1 is a block diagram of the system according to the invention.

Referring to FIG. 1, a block diagram of the diagnostic system of the present invention is shown. The computer system is configured with a plurality of power supplies 10, 12, 14 each of which is coupled via a main power switch 16 to an electric power line 18. Each power supply 10, 12, 14 is located physically within a cabinet (not shown) and is used to provide electrical power to the electronic circuitry within that cabinet. For example, the power supply 10 provides electrical power to a plurality of assemblies such as Unit 1-1 (20), Unit 1-2 (22) and Unit 1-M (24) where M is an integer. Other units in the same cabinet may also be powered by the power supply 10.

The units (20, 22, 24 etc.) may be printed circuit boards with a plurality of integrated circuits located thereon. Each board with circuits thereon may comprise, for example, a single board computer, a high-speed memory, an input/output controller or the like. The system may include more than one unit of a particular type coupled to a particular power supply and may also include further units of the same type coupled to other power supplies.

Each unit is designed with its own specific diagnostic hardware and on-unit diagnostic program usually located in a read-only-memory (ROM). The diagnostic hardware for each unit is actuated by a diagnostic system controller which is located in the power supply which powers the unit. The on-unit diagnostic hardware and software is designed to specifically test the electronic circuitry thereof to determine whether it is operating correctly and to note any errors.

Each error noted in the running of a diagnostic in a unit is transmitted on request from the diagnostic hardware over a communication link, such as link 32, between the diagnostic hardware in a unit and the controller coupled thereto and located in the power supply 10 chassis such as the diagnostic system controller (DSC) 30. The communication link 32 couples between the controller 30 and each of the diagnostic hardware sections within each of the units 20, 22, 24 which are powered by the power supply 10. The communication link (bus) 32 includes a transmit line (T) from the DSC 30 to each of the diagnostic hardware sections in the units 20, 22, 24 which is used to carry data from the DSC to the units. Coupled to the diagnostic sections in the units 20, 22, 24 is a receive line (R) which is used to transmit data from each of the units to the DSC.

The exact nature of the communication bus 32 is not critical to the invention. Those of skill in the art will recognize the merits of using a bus with few lines although a multi-line bus could be utilized. The present invention utilizes a bus designed to meet the RS-449 standard although the principals of the present invention are not limited to use of this standard communication link.

Communication between the DSC 30 and units coupled thereto via the communication bus 32 is on a master/slave basis. The DSC initiates all communications and the unit spoken to responds. The master on the communication bus 32 (DSC) initiates activity by a polling sequence. During polling, the DSC sends an enquiry containing a unit identification number, a function code and a parity bit along the bus 32. The selected unit can respond to the enquiry by sending a message to the DSC or, if no message is to be sent, the unit acknowledges with an echo of the poll enquiry. If the unit sends an illegal response, an uninteligible response or no response, a time out occurs at the DSC and the failure to properly respond is logged into the error log. If a unit responds and the message has a communications error in it, the DSC will poll the unit again with the function code for retransmit which causes the unit to again send its message.

The system illustrated in FIG. 1 additionally includes a second communication link 34 between the DSC 46 located in the power supply 12 and units 2-1, 2-2 and 2-N (40, 42, 44) where n is an integer between 1 and 22 in the preferred embodiment. The communications link 34 is preferably an RS-449 standard communications link of the type generally described above. As mentioned earlier, each unit 40, 42, 44 has a diagnostic hardware section which is designed in a conventional manner to test the electronic circuits of the unit and to communicate any detected test errors via the communications link 34 to the DSC 46.

In a similar fashion the DSC 50 which is located in the power supply 15 is coupled by a third communication link 52 to the diagnostic hardware 54, 56, 58 which is respectively located within unit 3-1, unit 3-2 and 3-P (60, 62, 64) where p is an integer between 1 and 22 in the preferred embodiment. The communication link 52 is of the same design as the links 32 and 24 although, as earlier indicated, it may be of another design if desired.

The system of FIG. 1 also has a controller bus 68, which is used to permit communications between the DSCs 30, 46 and 50. When power to the system is first turned on, each DSC 30, 46 and 50 performs a self-test to determine if it is operating correctly. Once the self-test is complete, each DSC 30, 46 and 50 monitors the console communication bus 70. At this time, no DSC 30, 46 or 50 is the master DSC.

When the operator enters a carriage return on the console 66, the carriage return is transmitted over the bus 70 to each DSC 30, 46 and 50 and each DSC tries to determine the baud rate of the transmission. At the same time, a timer is started at each DSC with the timer duration being a number related to the DSC number. For example, the timer duration for DSC 30 might be 10 milliseconds, for DSC 46 it might be 20 milliseconds and for DSC 50 it might be 30 milliseconds. The first DSC on the controller bus 68 to have its timer time out declares itself to be the master. The master DSC then begins polling on the controller bus 68. Activity on the controller bus 68 causes the other DSC's to stop counting down their counters and for the polled DSC to respond to the polling by the master DSC. If activity on the controller bus 68 ceases for more than 10 milliseconds, each DSC restarts its timer at the same value as after power is turned on and the first one to time out assumes control of the controller bus 68. A takeover message is sent to the old master DSC in case it is still able to "hear" messages on the controller bus 68. The takeover message will cause the old master DSC to become a slave controller if it is able to function thereafter.

Figure 2:
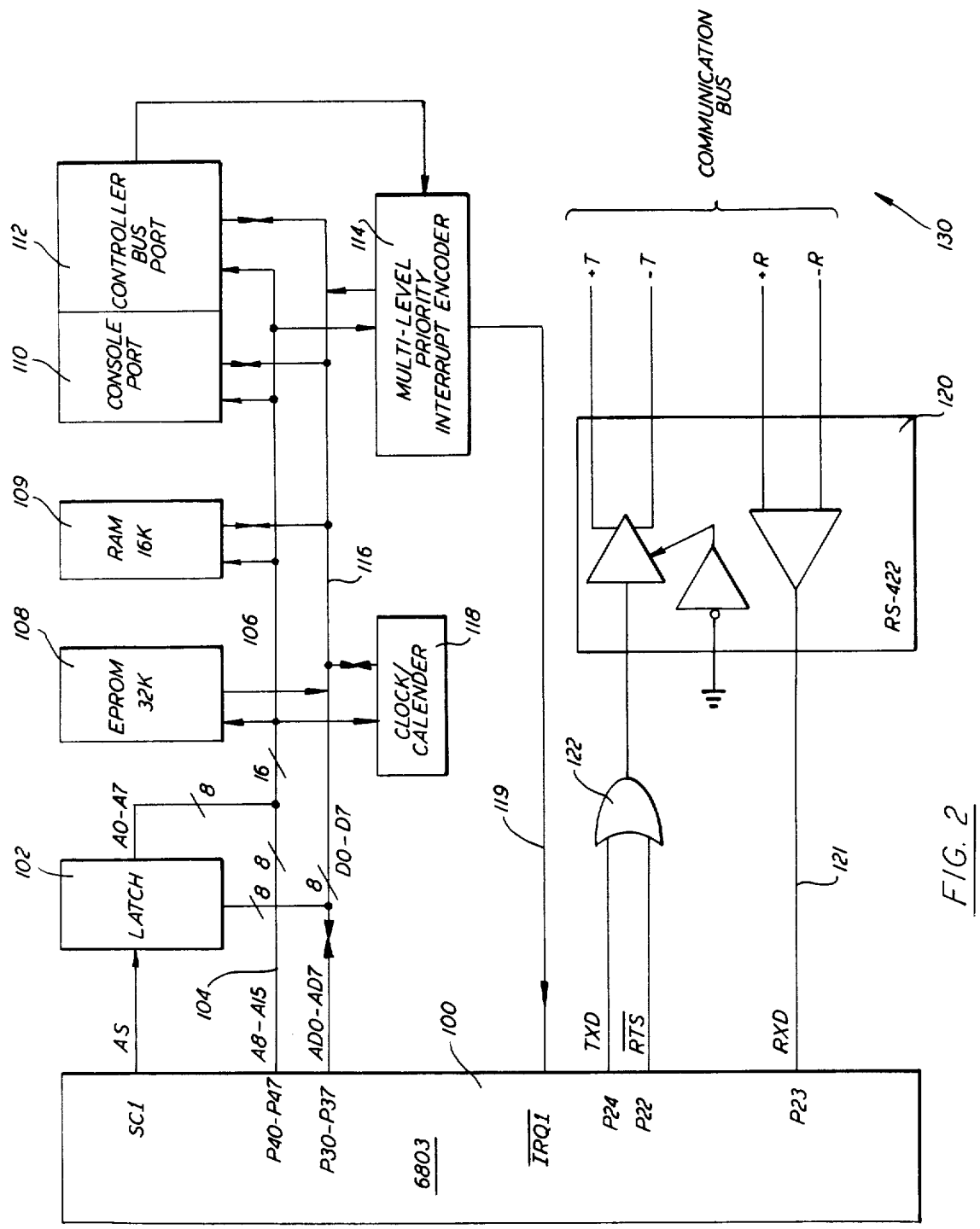
FIG. 2 illustrates the circuitry for each of the DSC's of FIG. 1.

Each DSC in the preferred embodiment is comprised of the circuits of the type illustrated in FIG. 2. Those skilled in the art will recognize that the circuits are exemplary of commercialy available circuits and that other circuit types could be utilized. The most important circuit of each DSC is the 6803 microprocessor 100. The microprocessor 100 is coupled to a latch circuit 102 which stores part of the address produced by the microprocessor 100. The address stored in the latch 102 is combined with the address bit positions 8-15 on line to form a 16 bit address on line 106. The address line 106 couples to an EPROM 108, a RAM 109, a console port 110 and the controller bus port 112. The EPROM 108 and the RAM 109 are used in the conventional manner to control the operation of the microprocessor 100. The console port 110 provides the circuits to couple the microprocessor 100 to the system console 66 (FIG. 1) over the bus 70. The controller bus port 112 provides the circuits to couple the microprocessor 100 to the controller bus 68 (FIG. 1).

A multi-level priority interrupt encoder 114 is coupled to the line 116 and the controller bus port 112. The function of the multi-level priority interrupt encoder is to respond to interrupt's received from the controller bus port 112 and provide, at an appropriate time, an interrupt request signal over the line 119 to the interrupt input pin designated IRQ1. The priority interrupt encoder 114 analyzes all the pending interrupt requests and, according to the priority assigned by the designer to each possible pending request, issues the interrupt request signal. When the microprocessor 100 responds to the interrupt request signal, it causes the encoder 114 to place data on the data bus 116 which is then interpreted by the microprocessor 100 to determine what interrupt is supposed to be handled. Once determined, the microcode in the EPROM 108 takes over control and processes the interrupt.

Coupled to the lines 106 and 116 is a clock/calendar 118 which is used to provide a time and date indication for error messages. When the microprocessor 100 processes an interrupt, the calendar/clock 118 is read so that the current date and time can be merged with any data message generated. In this way, when the message is read by the system operator at the console or when the message is read from a permanent error log, the date and approximate time can be noted. That information may be useful in system maintenance.

The circuit also includes connection to the communication bus illustrated at 130. This bus 130 may consist of two pairs of wires (T and −T) and (R and −R). The lines labeled T and −T are for carrying data transmitted from the microprocessor 100 over the bus 130 to the units on the communication bus 130. The lines labeled R and −R are for receiving data from units coupled to the DSC over the communication bus 130. The protocol selected for this bus is the RS-422 protocol and a RS-422 driver/receiver module 120 is coupled between the bus cables at 130 and the microprocessor 100. The module 120 is coupled by a line 121 to pin 23 which is the serial communications input to the microprocessor 100. Serial output from the microprocessor passes over the lines TXD and $\overline{RTS}$ to an OR gate and then to the module 120 which couples the signals to the T and −T lines (transmit lines from the DSC).

As already noted, each of the units such as unit 1-1 includes a portion on the plugable module which contains diagnostic hardware as illustrated in FIG. 1. This diagnostic portion includes a connection to a communication bus which permits the diagnostic hardware to communicate via that bus 32 to one of the DSCs located in the power supply module which powers the unit.

Figure 3:
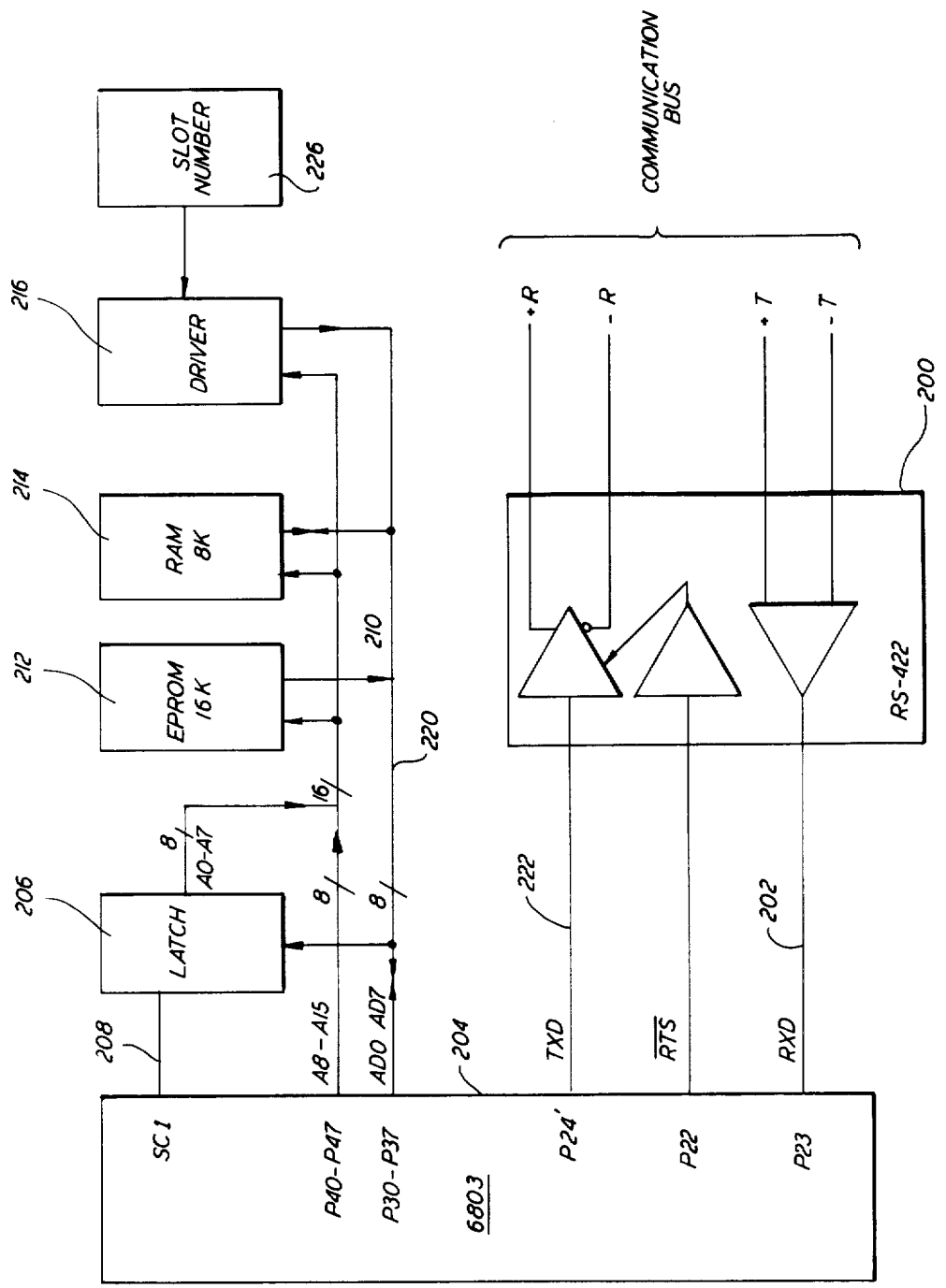
FIG. 3 illustrates the diagnostic hardware portion of each unit coupled to a DSC in FIG. 1.

A portion of the typical diagnostic hardware and particularly that portion relating to communication between the diagnostic hardware in a unit and the DSC is illustrated in FIG. 3. In that figure, the lines +T and −T are coupled to corresponding lines in the circuitry of FIG. 2 and provide a means for the diagnostic hardware in a unit to receive data over a serial communication bus from a DSC. Data communication over this bus is in a standard RS-422 format. Signals received from the DSC by the diagnostic hardware in a unit are combined within the module 200 to provide a data input signal on the line 202 which couples to input pin 23 of a microprocessor 204 which comprises, in the preferred embodiment, a conventional 6803 microprocessor.

When the microprocessor 204 has data which is to be transmitted to the DSC coupled thereto, the data is transmitted over the line 222 to the module 200 which produces signals on the outgoing lines labeled +R and −R. These lines, as illustrated in FIG. 1, couple data transmitted from the diagnostic hardware portion illustrated in FIG. 3 to the receive input to the DSC.

The configuration of FIG. 3 also includes an address buffer latch 206 which is controlled by the microprocessor 204 over the line 208 and is operative to store 8 data bits received from the microprocessor 204 over the lines labeled A0-7. When data is stored in the latch 206 it comprises eight data bits of a sixteen bit address which is placed on the sixteen bit bus 210 when the EPROM 212, RAM 214 or driver 216 which couples to the bus 210 are accessed by the microprocessor 204. The remaining eight buts on the bus 210 are provided directly from the microprocessor over the line labeled A8-15. Accordingly, the arrangement of FIG. 3 allows the microprocessor 204 to produce a 16 bit addresse on the bus 210 thereby providing a capability to directly address approximately 65,000 addressable locations from the bus 210, not all of which are usable in the illustrated embodiment.

The portion of the diagnostic hardware illustrated in FIG. 3 also includes a data bus 220 which couples between the data bus connection pins 30-37 of the microcomputer 204 and the latch 206, EPROM 210, RAM 214 and driver circuit 216. This data bus 220 is bidirectional so that data can be transmitted either from or to the microprocessor 204.

The circuitry of FIG. 3 includes slot number identification means 226 for indicating the slot number at which the unit containing this particular diagnostic hardware is located. The slot number means 226 may comprise a plurality of mechanical settable switches, jumper wires or any other suitable means for generating a unique location identification number which is then coupled to a driver circuit 216. The unique identification number is utilized by the microprocessor 204 to determine whether polling signals received over the communication bus are directed to that particular diagnostic hardware on a particular unit. This identity is established by the fact that the communication protocol polling on the communication bus includes a portion of the data which indicates the slot number to which data is being transmitted. The microprocessor in each diagnostic hardware portion detects this identification number and compares it with the setting for its particular slot number selector means 226. If an identity occurs, then the associated microprocessor 204 knows that the polling signal being transmitted on the communication bus is for that particular microprocessor and associated diagnostic hardware and not for any other diagnostic hardware on other units coupled to the communication bus. In a similar manner, the microprocessor 204 utilizes the data provided by the slot number selector means 226 to provide a unique number which is transmitted to the DSC coupled to the communication bus to indicate that data transmitted to the DSC comes from a particular diagnostic hardware on an identified unit board.

In operation, the system illustrated in FIGS. 1-3 performs in the following fashion. When the system is first turned on, the microprocessor 100 located in each of the power supplies is utilized in controlling the various functions within the power supply. At some point either as a part of the power on sequence or alternatively, in response to a signal from the signal console, each DSC begins a count down sequence in which a counter is set to an initial value which is a function of its DSC number and subsequently decremented. The count is typically stored at a given location in the RAM 109 for the particular DSC and the count is decremented by the micro-processor 100. When the count goes to 0, the DSC attempts to become the system master DSC coupled to the controller bus 68. This is accomplished by executing the system master control program which resides in the EPROM 108.

Each DSC has the capability of becoming the system master DSC. The system master DSC executes the system master control program which resides in the EPROM 108 coupled to the microprocessor 100 of that particular DSC. The function of the system master control program is to oversee the operation of all other DSCs and of all of the diagnostic hardware in the units coupled thereto. Once a master DSC has been determined, it begins polling on the controller bus 68 which notifies the other DSCs coupled thereto that a master controller has been determined. The master DSC must continue polling on the controller bus 68 at a certain minimum rate otherwise the other DSCs will decide that the master has somehow failed and a new countdown cycle is begun to establish an alternate system master.

The master DSC polls on the control bus 68 in the following manner. A poll byte or message header is transmitted which comprises a parity bit, two function code bits and five bits of identification code which identifies the DSC to which the message is directed. When the function code indicates that a message is being transmitted, the initial byte of data is followed by a plurality of bytes which have a prescribed format so they will be readily interpretable by the receiving DSC. A typical message, for example, might instruct the receiving DSC to conduct a complete diagnostic on each of the units coupled thereto. Thereafter, the master DSC would periodically request from the receiving DSC an indication as to whether all the diagnostics had been completed. Once they were, then the master DSC would be notified in reply to such a request, and thereafter the master would instruct the receiving DSC to transmit the results of the diagnostic conducted on each of the units coupled thereto. These diagnostic results could then be stored by the master DSC in the random access memory coupled thereto or it could be transmitted to the system console 66 to alert the system operator of the status of the various units coupled thereto.

It should be noted that the microprocessor within each DSC is utilized for other purposes than for diagnostic system control. As already noted, during power-on sequencing, the microprocessor is utilized to control the power supply. During normal running operation, the microprocessor also serves to monitor the operation of the power supply and, as necessary, it can also be utilized to monitor the cooling system within the cabinet containing the power supply. These functions, however, are not so demanding as to take up all possible processing time within the microprocessor in a typical DSC. Accordingly, the approach adopted in accordance with the present invention for putting the diagnostic system control function into the same microprocessor utilized for controlling the power supplies actually serves to improve the overall system utilization as the microprocessor within the power supply module is more fully utilized.

The master DSC in each of the slave DSCs on the control bus 68 are additional operative to monitor and control the diagnostic hardware of each unit coupled thereto over the appropriate communications bus. Such activity has already been described in greater detail earlier and need not be described further here. Suffice to say, however, that the master DSC can be expected to be very nearly fully utilized between controlling the operation of the slave DSCs on the controller bus 68 and the operation of the diagnostic hardware in the units coupled thereto. The selected microprocessor in the master DSC must accordingly be selected to be able to handle the desired level of processing capability for a configuration having the maximum number of intended units coupled thereto as well as the maximum number of slave DSCs coupled thereto over the controller bus 68.

While the foregoing description has been made with particular emphasis on a particular microprocessor in each of the DSCs and the diagnostic hardware sections of the units, it will be readily recognized by those of skill in the art that other microprocessors might be utilized for the same function as well. It will be further recognized by those of skill in the art that the particular configuration of the random access memories and read-only memories coupled to the microprocessors is quite typical of microprocessor applications, however, the configuration of these elements might have to be different in the event a fundamentally different type of microprocessor were utilized. Such changes in configuration, however, can readily be made by those of skill in the art without departing from the spirit and scope of the present invention as defined by the following claims.

What is claimed is:

1. A diagnostic system for detecting and indicating errors in a computer system including a plurality of replaceable logic modules, the system comprising, in combination:
   a controller bus;
   a plurality of communication buses;
   a plurality of diagnostic system controllers each including a microprocessor, a read-only-memory, a random access memory, means to couple the microprocessor to said controller bus and means to couple said microprocessor to only one of said communication buses;
   means in each of said diagnostic system controllers for establishing one of said diagnostic system controllers as the master diagnostic system controller on said controller bus, said master diagnostic system controller being operative to control communication on said controller bus;
   a plurality of functional units associated with each of said communication buses and each said functional unit including diagnostic testing circuits including a microprocessor for testing the functional unit and including means to communicate on said each of said communication buses coupled thereto in response to polling signals therein; and
   each said diagnostic system controller including means to produce polling signals on the communication bus coupled thereto.

2. The system of claim 1 wherein each said diagnostic system controller is disposed in a power supply and the microprocessor therein is utilized to control the power supply in addition to performing diagnostic functions.

3. The system of claim 1 wherein each said diagnostic system controller includes means to respond to polling signals on said controller bus from said master diagnostic system controller, said polling signal including an identifying portion which uniquely identifies the one diagnostic system controller which is to respond thereto.

4. The system of claim 1 wherein each said diagnostic system controller includes means to attempt to establish itself as said master system diagnostic controller in the event that no communications occur over said controller bus for a prescribed period of time.

5. The system of claim 2 wherein each said diagnostic system controller includes means to respond to polling signals on said controller bus from said master diagnostic system controller, said polling signal including an identifying portion which uniquely identifies the one diagnostic system controller which is to respond thereto.

6. The system of claim 2 wherein each said diagnostic system controller includes means to attempt to establish itself as said master system diagnostic controller in the event that no communications occur over said controller bus for a prescribed period of time.

7. The system of claim 5 wherein each said diagnostic system controller includes means to attempt to establish itself as said master system diagnostic controller in the event that no communications occur over said controller bus for a prescribed period of time.

8. The system of claim 1 additionally including a system console coupled via a console bus to each said diagnostic system controlling said master diagnostic system controller including means to transmit messages onto said console bus to permit the console operator to control the diagnostic system and to receive data from said console bus indicating system status.

9. A diagnostic system for a multi-processor computer comprising, in combination:

a controller bus;

a plurality of diagnostic system controllers each coupled to said controller bus, each diagnostic system controller having a countdown timer settable to a unique value different from that of all other diagnostic system controllers and actuated at substantially the same time, the diagnostic system controller in which said countdown timer first goes to zero becomes the master diagnostic system controller;

each diagnostic system controller being responsive to unique signals on said control bus from said master diagnostic system controller to place reply signals to said master diagnostic system controller on said controller bus;

a communication bus coupled to each said diagnostic system controller;

a plurality of processor units coupled to each said communication bus, each processor unit including diagnostic hardware actuated by a first unique signal on said communication bus to perform diagnostic tests on the hardware in said processor unit and to place the diagnostic test results to said communicator bus in response to the receipt of a second unique signal;

each diagnostic system controller including means to produce said first and said second unique signals on said controller bus; and said master diagnostic system controller being operative to actuate said means to produce said first and said second unique signals on each said controller bus.

* * * * *